United States Patent
Kato et al.

(10) Patent No.: US 9,287,055 B2
(45) Date of Patent: Mar. 15, 2016

(54) SOLID ELECTROLYTIC CAPACITOR AND METHOD FOR MANUFACTURING SAME

(71) Applicant: SANYO ELECTRIC CO., LTD., Osaka (JP)

(72) Inventors: Toshiyuki Kato, Kyoto (JP); Tomohiro Mitsuyama, Fukuoka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 61 days.

(21) Appl. No.: 14/358,963

(22) PCT Filed: Oct. 18, 2012

(86) PCT No.: PCT/JP2012/076966
§ 371 (c)(1),
(2) Date: May 16, 2014

(87) PCT Pub. No.: WO2013/073332
PCT Pub. Date: May 23, 2013

(65) Prior Publication Data
US 2014/0313638 A1    Oct. 23, 2014

(30) Foreign Application Priority Data

Nov. 18, 2011   (JP) ................................ 2011-252981

(51) Int. Cl.
| | |
|---|---|
| H01G 4/06 | (2006.01) |
| H01G 9/07 | (2006.01) |
| H01G 9/052 | (2006.01) |
| H01G 9/00 | (2006.01) |
| H01G 11/04 | (2013.01) |
| H01G 9/15 | (2006.01) |

(52) U.S. Cl.
CPC ............... *H01G 9/07* (2013.01); *H01G 9/0032* (2013.01); *H01G 9/052* (2013.01); *H01G 11/04* (2013.01); *H01G 9/15* (2013.01); *Y10T 29/417* (2015.01)

(58) Field of Classification Search
CPC ........................................................ H01G 9/07
USPC ......................................................... 361/524
See application file for complete search history.

(56) References Cited

U.S. PATENT DOCUMENTS

| | | | | |
|---|---|---|---|---|
| 3,614,544 A | * | 10/1971 | Mosebach ............ | H01G 9/0032 361/434 |
| 8,164,884 B2 | * | 4/2012 | Nobuta ................ | H01G 9/0036 29/25.03 |
| 8,422,201 B2 | * | 4/2013 | Harada ................ | H01G 9/0029 29/25.03 |
| 2006/0082951 A1 | * | 4/2006 | Hirata .................... | H01G 9/028 361/524 |
| 2010/0254071 A1 | * | 10/2010 | Nishimura ........... | H01G 9/0032 361/524 |

FOREIGN PATENT DOCUMENTS

| | | |
|---|---|---|
| JP | 60-60709 A | 4/1985 |
| JP | 03-004512 A | 1/1991 |

(Continued)

OTHER PUBLICATIONS

International Search Report issued in PCT/JP2012/076966, dated Nov. 13, 2012, with English translation.

*Primary Examiner* — Eric Thomas
(74) *Attorney, Agent, or Firm* — McDermott Will & Emery LLP

(57) ABSTRACT

A solid electrolytic capacitor includes: an anode body; a first dielectric layer formed on the anode body and including metal oxide; a second dielectric layer formed on the first dielectric layer and including an insulating polymer; a third dielectric layer formed on the second dielectric layer and including a dielectric substance having a higher dielectric constant than that of the metal oxide; and a solid electrolyte layer formed on third dielectric layer.

8 Claims, 4 Drawing Sheets

FOREIGN PATENT DOCUMENTS

| | | |
|---|---|---|
| JP | 04-042519 A | 2/1992 |
| JP | 04-206619 A | 7/1992 |
| JP | 11-172489 A | 6/1999 |
| JP | 2000-068160 A | 3/2000 |
| JP | 2001307958 A * | 11/2001 |
| JP | 2006-310493 A | 11/2006 |
| JP | 2007-173454 A | 7/2007 |
| JP | 2008-205112 A | 9/2008 |
| JP | 2009-224568 A | 10/2009 |

* cited by examiner

SOLID ELECTROLYTIC CAPACITOR AND METHOD FOR MANUFACTURING SAME

RELATED APPLICATIONS

This application is the U.S. National Phase under 35 U.S.C. §371 of International Application No. PCT/JP2012/076966, filed on Oct. 18, 2012, which in turn claims the benefit of Japanese Application No. 2011-252981, filed on Nov. 18, 2011, the disclosures of which Applications are incorporated by reference herein.

TECHNICAL FIELD

The present invention relates to a solid electrolytic capacitor and a method for manufacturing the same.

BACKGROUND ART

Valve metal oxides such as tantalum oxide and niobium oxide have a high dielectric constant and insulation property, and are used as dielectric material for solid electrolytic capacitors.

Recently, the solid electrolytic capacitors have been increasingly used for electronic devices such as a portable telephone, notebook-sized personal computer, and a portable game apparatus, and automotive devices such as a car navigation system, and an engine control unit. As these devises have had higher performance, solid electrolytic capacitors having a smaller size and higher capacity have been required.

In order to allow the solid electrolytic capacitor to have higher capacity, it is necessary to (1) increase a surface area of an anode body, (2) make a dielectric layer thinner, and (3) improve a dielectric constant of the dielectric layer. Among them, in particular, for enhancing the capacity, it is most effective to (3) improve a dielectric constant of the dielectric layer.

In order to improve a dielectric constant of a dielectric layer, Japanese Patent Unexamined Publication No. S60-60709 proposes an electrolytic capacitor having a two-layered structure, which is obtained by anodizing aluminum so as to form an aluminum oxide dielectric layer, then coating a surface of the dielectric layer with a metal alkoxide solution including barium or titanium, and heat-treating thereof, so that a barium titanate layer is formed on the aluminum oxide dielectric layer.

SUMMARY OF THE INVENTION

A solid electrolytic capacitor of the present invention includes an anode body, a first dielectric layer formed on the anode body and including metal oxide, a second dielectric layer formed on the first dielectric layer and including an insulating polymer, a third dielectric layer formed on the second dielectric layer and including a dielectric substance having a higher dielectric constant than that of the metal oxide; and a solid electrolyte layer formed on the third dielectric layer.

It is beneficial that the insulating polymer includes at least one selected from the group consisting of a sulfonic acid group, a carboxylic acid group, a phosphoric acid group, a phosphonic acid group and a hydroxyl group, and is cross-linked.

Examples of the insulating polymer include cross-linked polyvinyl alcohol which is cross-linked by using a cross-linking agent including at least two of an aldehyde group, a hydroxyl group and a carboxyl group, or a derivative of the cross-linked polyvinyl alcohol. Note here that "including at least two of an aldehyde group, a hydroxyl group and a carboxyl group" is not limited to including the same functional groups, for example, including two aldehyde groups, but denotes that different functional groups, for example, one aldehyde group and one hydroxyl group may be included.

Examples of the dielectric substance constituting the third dielectric layer include barium titanate particles.

A manufacturing method in accordance with the present invention is a method for manufacturing a solid electrolytic capacitor including an anode body, a first dielectric layer formed on the anode body and including metal oxide; a second dielectric layer formed on the first dielectric layer and including an insulating polymer; a third dielectric layer formed on the second dielectric layer and including a dielectric substance having a higher dielectric constant than that of the metal oxide; and a solid electrolyte layer formed on the third dielectric layer. The method includes the steps of: forming the second dielectric layer on a metal member forming the anode body; and soaking the metal member provided with the second dielectric layer in a solution including an ion of a first metal that is at least one of metal elements constituting the third dielectric layer, carrying out energization using the metal member as an anode for anodizing a portion of the metal member, which is brought into contact with the second dielectric layer, so as to form the first dielectric layer, and precipitating an oxide layer of an ion of the first metal on the second dielectric layer.

It is further beneficial that the manufacturing method of the present invention further comprising the steps of soaking the metal member on which the oxide layer is precipitated in a solution including an ion of the second metal other than the ion of the first metal among metal elements constituting the third dielectric layer when the third dielectric layer includes a plurality of metal elements, and heating the metal member, for changing the oxide layer into a dielectric substance including the first metal and the second metal so as to form the third dielectric layer.

It is beneficial that the dielectric substance constituting the third dielectric layer includes barium titanate. In this case, the solution including an ion of the first metal is a solution including a trivalent titanium ion, and the solution including the ion of the second metal is a solution including a barium ion.

DESCRIPTION OF EMBODIMENTS

The solid electrolytic capacitor disclosed in Japanese Patent Unexamined Publication No. S60-60709 has problems that adhesiveness between two dielectric layers is not sufficient, so that leakage current is increased.

The present disclosure provides a solid electrolytic capacitor capable of suppressing leakage current and a method for manufacturing the solid electrolytic capacitor.

Figure 1:
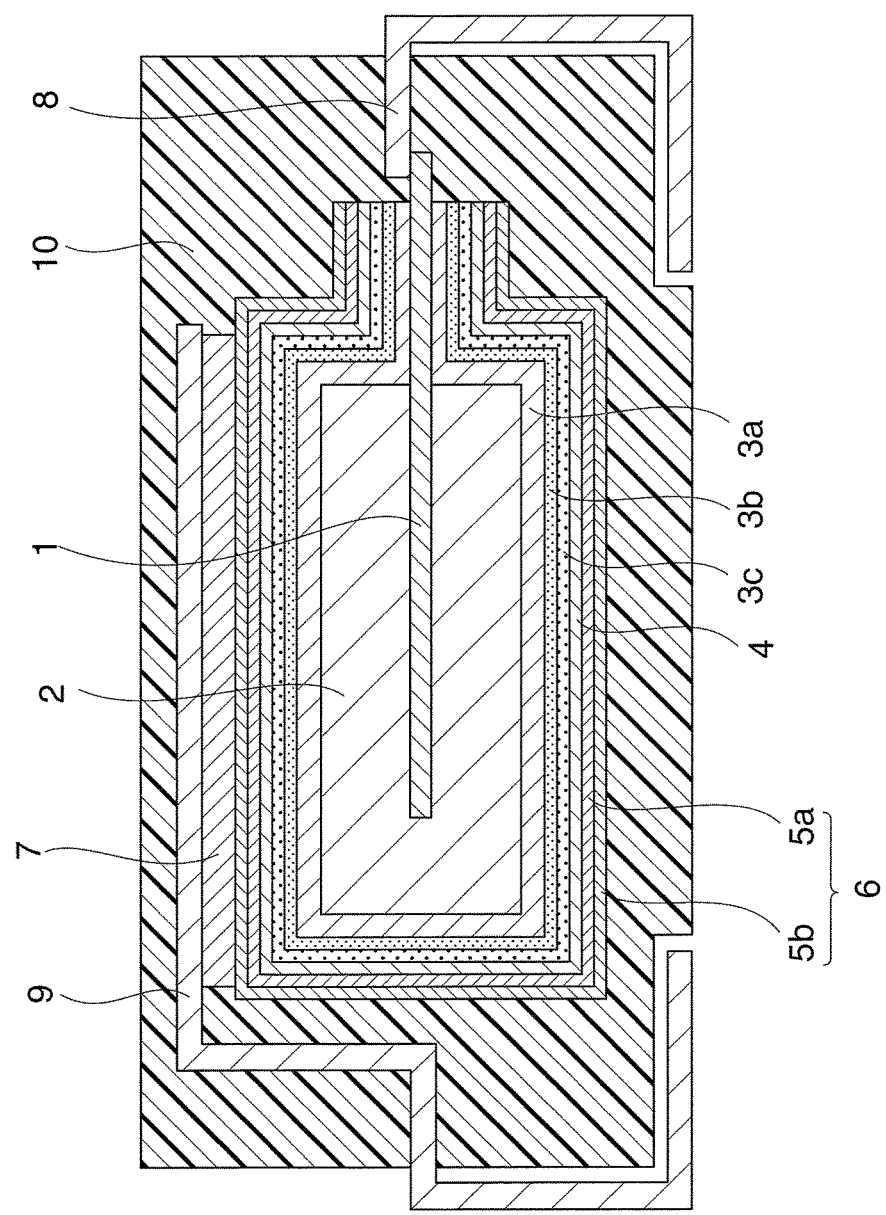
FIG. 1 is a schematic sectional view showing a solid electrolytic capacitor in accordance with one embodiment of the present invention.

FIG. 1 is a schematic sectional view showing a solid electrolytic capacitor in accordance with one embodiment of the present invention.

As shown in FIG. 1, anode lead 1 is embedded in anode body 2. Anode body 2 is produced by molding powder of valve metal or an alloy including valve metal as a main component, and sintering the molded product. Therefore, anode body 2 has a porous structure. Although not shown in FIG. 1, the porous structure is provided with a plurality of fine pores penetrating from the inside to the outside. The thus produced anode body 2 is produced such that the outer shape thereof is substantially a rectangular parallelepiped in this exemplary embodiment.

The valve metal forming anode body 2 is not particularly limited as long as it can be used for a solid electrolytic capacitor, but examples of the valve metal include tantalum, niobium, titanium, aluminum, hafnium, zirconium, zinc, tungsten, bismuth, antimony, and the like. Among them, tantalum, niobium, titanium, and aluminum are particularly preferable because the dielectric constant of oxide thereof is high and raw material thereof is easily available. Furthermore, examples of the alloy including a valve metal as a main component include alloys of two types of valve metals, for example, two or more metals such as tantalum and niobium, and alloys of a valve metal and other metal. When an alloy of valve metal and other metal is used, a percentage of the valve metal is preferably 50 atom % or more.

Furthermore, as the anode body, a metal foil of a valve metal or an alloy foil may be used. In order to increase the surface area of the anode body, an etched product of a metal foil or an alloy foil, a rolled product of such foils, and a laminated product thereof may be used. Furthermore, a product formed by sintering such foils and powder together may be used.

First dielectric layer 3a is formed on anode body 2. First dielectric layer 3a is formed of metal oxide. Preferably, first dielectric layer 3a is formed by oxidizing the surface of anode body 2 by, for example, anodization (chemical formation). Therefore, it is preferable that first dielectric layer 3a is formed of tantalum oxide ($Ta_2O_5$), niobium oxide ($Nb_2O_5$), titanium oxide ($TiO_2$), and aluminum oxide ($Al_2O_3$). Furthermore, it is preferable that first dielectric layer 3a is formed of amorphous metal oxide.

Second dielectric layer 3b is formed on first dielectric layer 3a. Second dielectric layer 3b is formed of an insulating polymer. Examples of the insulating polymer constituting second dielectric layer 3b include polyvinyl alcohol, polyamide, polyimide, polyvinyl chloride, polyethylene, polypropylene, polyvinylidene fluoride and derivatives thereof, and the like. When anode body 2 is soaked in an aqueous solution after second dielectric layer 3b is formed, it is preferable that second dielectric layer 3b is insolubilized so that it is not dissolved in the aqueous solution. Therefore, it is preferable that water-soluble polymers such as polyvinyl alcohol are insolubilized by cross-linking.

Third dielectric layer 3c is formed on second dielectric layer 3b. Third dielectric layer 3c is formed of a dielectric substance having a higher dielectric constant than that of metal oxide constituting first dielectric layer 3a. Examples of such a dielectric substance include barium titanate ($BaTiO_3$), strontium titanate ($SrTiO_3$), calcium titanate ($CaTiO_3$), a solid solution thereof, and the like.

Solid electrolyte layer 4 is formed on third dielectric layer 3c. Solid electrolyte layer 4 can be formed of manganese dioxide, an electro-conductive polymer, or the like. From the viewpoint of reducing the equivalent series resistance (ESR), an electro-conductive polymer is preferably used. Examples of the electro-conductive polymer include polypyrrole, polythiophene, polyethylene dioxy thiophene, polyaniline, polyacetylene, or the like. An electro-conductive polymer layer as solid electrolyte layer 4 can be formed by conventionally well-known methods such as chemical polymerization and electrolytic polymerization.

In this exemplary embodiment, anode body 2 is porous structure, first dielectric layer 3a, second dielectric layer 3b, third dielectric layer 3c, and solid electrolyte layer 4 are also formed on the surface the pores of anode body 2. FIG. 1 schematically shows first, second and third dielectric layers 3a, 3b and 3c as well as solid electrolyte layer 4, which are formed on the outer peripheral sides of anode body 2 and anode lead 1, but does not show each layer formed on the surface of the pores of the porous structure mentioned above.

Carbon layer 5a is formed on solid electrolyte layer 4 on the outer peripheral part of anode body 2, and silver layer 5b is formed on carbon layer 5a. Carbon layer 5a can be formed by coating carbon paste. Silver layer 5b can be formed by coating silver paste and baking thereof. In this exemplary embodiment, carbon layer 5a and silver layer 5b form cathode layer 6.

Cathode terminal 9 is coupled to silver layer 5b via conductive adhesive layer 7. Furthermore, anode terminal 8 is coupled to anode lead 1. Mold resin outer package 10 is formed so that end portions of anode terminal 8 and cathode terminal 9 are pulled out to the outside.

As mentioned above, a solid electrolytic capacitor in accordance with this exemplary embodiment is formed.

Figure 2:
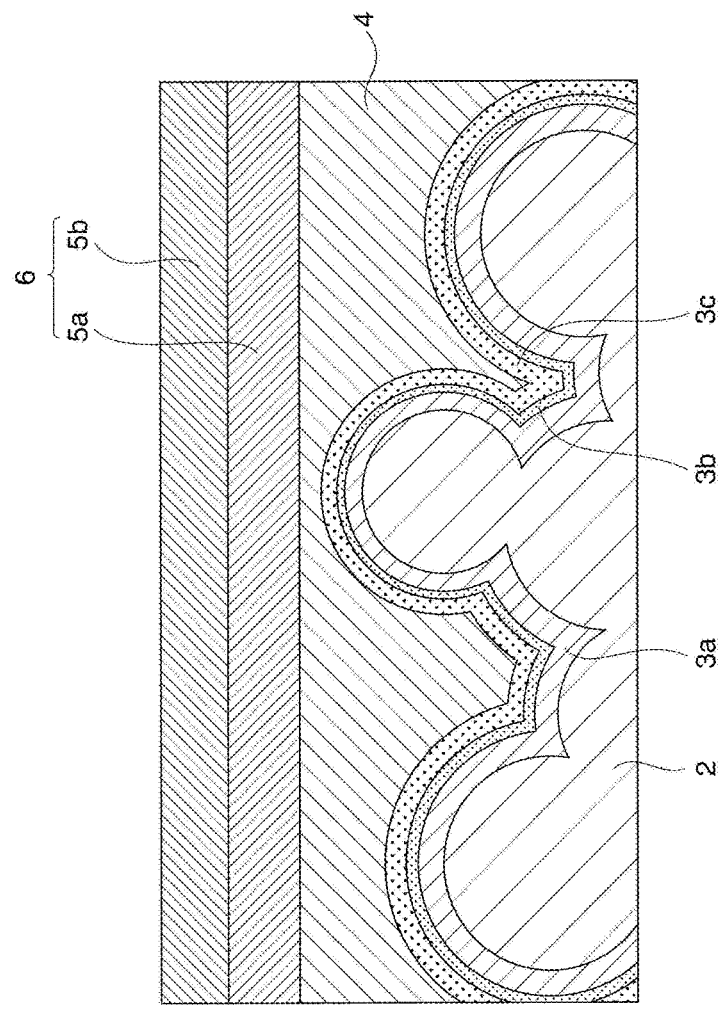
FIG. 2 is a schematic sectional view showing by enlarging a vicinity of a surface of an anode body in the solid electrolytic capacitor in accordance with one embodiment of the present invention.

FIG. 2 is a schematic sectional view showing by enlarging a vicinity of a surface at an outer surface side of anode body 2 of the solid electrolytic capacitor shown in FIG. 1.

As shown in FIG. 2, anode body 2 is porous structure, and includes fine pores inside thereof. On the surface of anode body 2, first dielectric layer 3a, second dielectric layer 3b, and third dielectric layer 3c are formed sequentially in this order. Solid electrolyte layer 4 is formed on third dielectric layer 3c, and cathode layer 6 including carbon layer 5a and silver layer 5b is formed on solid electrolyte layer 4.

A thickness of second dielectric layer 3b is preferably 1 nm or more and preferably 10 nm or less. The thickness is further preferably 3 nm or more and 5 nm or less. When the thickness of second dielectric layer 3b is too small, an effect of reducing leakage current cannot be obtained sufficiently. Furthermore, when the thickness of second dielectric layer 3b is too large, when first dielectric layer 3a is formed by carrying out anodization in a state in which second dielectric layer 3b is formed on the surface of anode body 2, an electric current does not easily flow, thus making it difficult to form first dielectric layer 3a in the below-mentioned manufacturing steps.

In this exemplary embodiment, anode body 2 is formed of tantalum. Therefore, first dielectric layer 3a is formed of amorphous tantalum oxide ($Ta_2O_5$) formed by anodizing anode body 2.

Second dielectric layer 3b is formed of a polyvinyl alcohol cross-linked product. The relative dielectric constant of polyvinyl alcohol is 2. Since polyvinyl alcohol has extremely high affinity with water among a large number of polymers, it has excellent water solubility. Therefore, a polyvinyl alcohol molecule can easily diffuse to the inside of anode body 2 that is porous structure in an aqueous solution. Therefore, polyvinyl alcohol is suitable for uniformly covering the surface of anode body 2 having a high specific surface area.

Anode body 2 is soaked into polyvinyl alcohol aqueous solution to attach polyvinyl alcohol to the surface of anode body 2, dried thereof, and then brought into contact with an aqueous solution of a cross-linking agent such as glutaraldehyde and boric acid. Thus, a polyvinyl alcohol cross-linked product can be obtained.

In this exemplary embodiment, third dielectric layer 3c is formed of barium titanate. An oxide of barium titanate group has a relative dielectric constant of about 1000 to 6000, which is extremely large as compared with a relative dielectric constant of about 27 of tantalum oxide. Barium titanate can be formed by manufacturing steps mentioned below.

When the dielectric layer in accordance with this exemplary embodiment is formed such that the thickness thereof is substantially the same as the thickness of the dielectric layer of a solid electrolytic capacitor having a dielectric layer, which is formed by anodizing an anode, it is preferable that the thickness of second dielectric layer 3b is made to be the smallest and the thickness of third dielectric layer 3c is made to be largest if the dielectric constant of second dielectric layer 3b is lower than the dielectric constant of first dielectric layer 3a and third dielectric layer 3c. Thus, an effect of enhancing the capacitance according to third dielectric layer 3c can be increased.

In this exemplary embodiment, the thickness of second dielectric layer 3b is extremely smaller than the thicknesses of first dielectric layer 3a and third dielectric layer 3c. Specifically, the thickness of second dielectric layer 3b is preferably in the range from 1/100 to 1/10 of the thickness of first dielectric layer 3a. The thickness of second dielectric layer 3b is preferably in the range from 1/100 to 1/10 of the thickness of third dielectric layer 3c.

Figure 3:
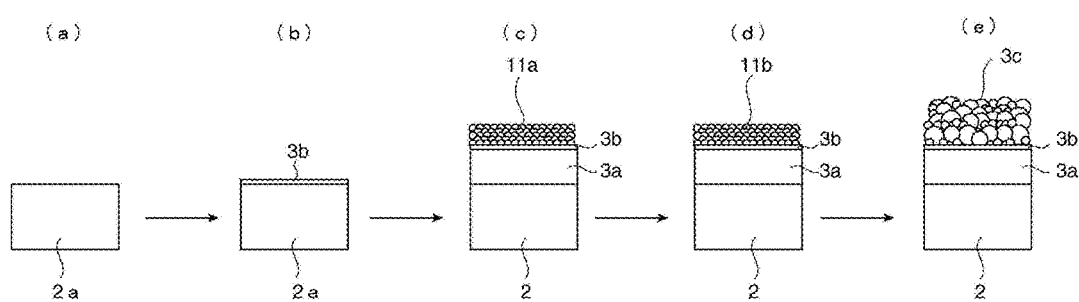
FIG. 3 is a schematic view showing manufacturing steps of the solid electrolytic capacitor in accordance with one embodiment of the present invention.

FIG. 3 is a schematic sectional view for illustrating a method for forming first dielectric layer 3a, second dielectric layer 3b and third dielectric layer 3c in accordance with this exemplary embodiment.

As shown in FIG. 3(a), metal member 2a forming anode body 2 is prepared. Next, as shown in FIG. 3(b), second dielectric layer 3b is formed on metal member 2a. In this exemplary embodiment, as second dielectric layer 3b, a polyvinyl alcohol cross-linked product is formed.

Next, metal member 2a provided with second dielectric layer 3b shown in FIG. 3(b) is soaked in a solution containing an ion of first metal, and the first metal is at least one of metal elements constituting third dielectric layer 3c. In this exemplary embodiment, metal member 2a is soaked in a hydrochloric acid (HCl) aqueous solution including titanium trichloride ($TiCl_3$), which is a solution including a trivalent titanium ion ($Ti^{3+}$) as an ion of the first metal. In this state, metal member 2a is used as an anode, and a cathode is located in the hydrochloric acid aqueous solution, and energization is carried out, so that a portion of metal member 2a at a side that is brought into contact with second dielectric layer 3b is anodized to be changed into amorphous tantalum oxide. Thus, first dielectric layer 3a made of amorphous tantalum oxide is formed.

As shown in FIG. 3(c), first dielectric layer 3a is formed on anode body 2 by the above-mentioned anodization, and tetravalent titania sol ($Ti(OH)_4$, $TiO(OH)_2$) 11a, which are formed by oxidation of trivalent titanium ions in an aqueous solution, is directly precipitated on a polyvinyl alcohol cross-linked film that is second dielectric layer 3b.

Next, by heating anode body 2 shown in FIG. 3(c), tetravalent titania sol 11a is dehydrated to be formed into titanium oxide film ($TiO_2$) 11b as shown in FIG. 3(d). Since titanium oxide film 11b has a higher dielectric constant than that of tantalum oxide of anode body 2, titanium oxide film 11b may be used as third dielectric layer 3c in the present invention. Therefore, titanium oxide film 11b is used as third dielectric layer 3c, solid electrolyte layer 4 is formed on titanium oxide film 11b, and thereafter a solid electrolytic capacitor may be produced as mentioned above.

In this exemplary embodiment, furthermore, anode body 2 in a state shown in FIG. 3(d) is soaked in a barium hydroxide ($Ba(OH)_2$) aqueous solution including a barium ion ($Ba^{2+}$) as an ion of the second metal, and heated in a hermetically sealed container to change titanium oxide film 11b into barium titanate, so that third dielectric layer 3c including barium titanate particles is formed as shown in FIG. 3(e).

Note here that it is preferable that a heating temperature for heating and dehydrating titania sol 11a to obtain titanium oxide film 11b is preferably in a temperature range from 100 to 200° C. Furthermore, a temperature at which titanium oxide film 11b and barium hydroxide are reacted to each other is preferably in a temperature range from 50 to 200° C.

Solid electrolyte layer 4 and cathode layer 6 are formed on third dielectric layer 3c as mentioned above so as to produce a solid electrolytic capacitor.

As mentioned above, first dielectric layer 3a, second dielectric layer 3b, and third dielectric layer 3c can be formed on anode body 2.

According to the manufacturing method of the present invention, as mentioned above, metal member 2a forming anode body 2 is provided thereon with second dielectric layer 3b and soaked in a solution including at least one metal ion of metal elements constituting third dielectric layer 3c, and energization is carried out using metal member 2a as an anode. Thus, a portion of metal member 2a that is brought into contact with second dielectric layer 3b is anodized so as to form first dielectric layer 3a, and oxide layer 11a of the metal ion contained in the solution for soaking can be precipitated on the second dielectric layer 3b.

Therefore, first dielectric layer 3a, second dielectric layer 3b, and third dielectric layer 3c can be formed by simple steps.

In this exemplary embodiment, as mentioned above, for forming a titania sol of tetravalent Ti, a solution including a trivalent Ti ion is used to cause anodization and oxidation of trivalent Ti ion. Thereby, the titania sol of tetravalent Ti is formed. In this exemplary embodiment, by soaking in the solution of trivalent Ti ion as a metal ion having such a low valency, so that anodization and oxidation of metal ion are carried out and valency is changed. Thereby, Ti ion is activated and easily reacted with water, so that trivalent Ti ion can be oxidized uniformly and efficiently on second dielectric layer 3b and a layer of tetravalent titania sol can be precipitated.

Furthermore, as mentioned above, titanium oxide film 11b can be formed by heating and dehydrating titania sol 11a of tetravalent Ti, and titanium oxide film 11b as it is may be used as third dielectric layer 3c. In this exemplary embodiment, soaking in an aqueous solution including a barium ion as an ion of the second metal and heat treatment at 60 to 180° C. are carried out, and titanium oxide film 11b is changed into barium titanate, which is used as third dielectric layer 3c. A capacity of the solid electrolytic capacitor can be further increased since the dielectric constant of barium titanate is further higher than the dielectric constant of titanium oxide.

Furthermore, according to the manufacturing method of this exemplary embodiment, second dielectric layer 3b is formed on metal member 2a forming anode body 2, and then anodization is carried out in a hydrochloric acid aqueous solution including titanium trichloride, so that the thickness of first dielectric layer 3a having a lower dielectric constant than third dielectric layer 3c can be controlled to be thinner.

Furthermore, since titanium oxide film 11b is changed into barium titanate by heating it in a barium hydroxide aqueous solution at a temperature range from 60 to 180° C., as compared with the case in which a metal alkoxide solution including barium or titanium is coated and heated at 400 to 500° C., deterioration of first dielectric layer 3a and second dielectric layer 3b can be suppressed, thus reducing leakage current.

In the present invention, since second dielectric layer 3b is formed, third dielectric layer 3c directly formed thereon can be held on first dielectric layer 3a with excellent adhesiveness. Furthermore, since second dielectric layer 3b is uniformly formed between first dielectric layer 3a and third dielectric layer 3c with excellent adhesiveness, occurrence of leakage current can be suppressed.

Furthermore, since third dielectric layer 3c having a higher dielectric constant than that of first dielectric layer 3a is formed, higher capacity can be achieved as compared with a conventional solid electrolytic capacitor having a dielectric layer formed by anodization of an anode so that the thickness of the dielectric layer have the same thickness as a total thickness of the first dielectric layer 3a, second dielectric layer 3b and third dielectric layer 3c.

Furthermore, since third dielectric layer 3c can be held by second dielectric layer 3b with excellent adhesiveness, exfoliation of third dielectric layer 3c can be suppressed, thus suppressing deterioration of electrostatic capacity for a long time. Therefore, reliability of the solid electrolytic capacitor can be improved.

Furthermore, since first dielectric layer 3a, which is brought into contact with second dielectric layer 3b after second dielectric layer 3b is formed, adhesiveness between first dielectric layer 3a and second dielectric layer 3b can be improved. Therefore, it is possible to suppress interlayer exfoliation between first dielectric layer 3a and second dielectric layer 3b.

Furthermore, since second dielectric layer 3b is formed between first dielectric layer 3a and third dielectric layer 3c, withstand voltage characteristics can be improved.

Furthermore, in this exemplary embodiment, third dielectric layer 3c is formed of particles of barium titanate having high crystalline. Barium titanate formed of crystalline particles does not easily suppress leakage current, but first dielectric layer 3a of this exemplary embodiment is formed of amorphous tantalum oxide ($Ta_2O_5$) that is stable as oxide of a valve metal, even when third dielectric layer 3c made of barium titanate of crystalline particles is provided, occurrence of leakage current can be suppressed by first dielectric layer 3a. Furthermore, in this exemplary embodiment, since second dielectric layer 3b is provided between first dielectric layer 3a and third dielectric layer 3c with polyvinyl alcohol having high insulation property, occurrence of leakage current can be suppressed.

EXAMPLE

Hereinafter, the present invention is further described with reference to specific Examples, but the present invention is not limited to the following Examples.

A solid electrolytic capacitor shown in FIGS. 1 and 2 is produced as follows.

(Step 1)

A tantalum sintered body is produced by sintering tantalum particles, and the tantalum sintered body is used as metal member 2a forming anode body 2. Metal member 2a is soaked in 0.1 wt. % polyvinyl alcohol aqueous solution and then dried. Thereafter metal member 2a is soaked into 1.0 wt. % glutaraldehyde aqueous solution, and then dried by heating. Thus, second dielectric layer 3b including polyvinyl alcohol cross-linked product insoluble in water is formed on metal member 2a.

(Step 2)

Metal member 2a that has been subjected to treatment of Step 1 is soaked in an aqueous solution including 1 wt. % titanium trichloride and 0.4 wt. % hydrochloric acid, and constant-current energization is carried out by using metal member 2a as an anode and platinum as a cathode. Thus, as mentioned above, first dielectric layer 3a is formed and a layer including titania sol 11a is formed on second dielectric layer 3b.

Note here that even when metal member 2a that is not provided with second dielectric layer 3b is anodized, a titania sol is not formed. This is thought to be because a speed of oxidation reaction for forming tantalum oxide from tantalum is larger than that of oxidation reaction for forming titanium hydroxide (titania sol) from a titanium ion. It seems that when second dielectric layer 3b is formed, a reaction in which metal member 2a is oxidized can be appropriately suppressed, so that titanium hydroxide (titania sol) can be precipitated.

Note here that a thickness of second dielectric layer 3b is 4 nm.

(Step 3)

Anode body 2 that has been subjected to treatment of Step 2 is heated at 150° C. for two hours, and titanium hydroxide (titania sol) is heated to be dehydrated to form a titanium oxide film. As mentioned above, titanium oxide film 11b may be used as third dielectric layer 3c.

(Step 4)

Anode body 2 that has been subjected to treatment of Step 3 is soaked in 5 wt. % barium hydroxide aqueous solution, and heated at 120° C. for 72 hours in a hermetically sealed container. This hydrothermal treatment changes titanium oxide into barium titanate, and forms third dielectric layer 3c including barium titanate.

When an aqueous solution for soaking is changed to a strontium hydroxide aqueous solution instead of a barium hydroxide aqueous solution, a dielectric substance constituting third dielectric layer 3c can be made to be strontium titanate. Similarly, by selecting metal ions to be contained in a solution to be used for anodization and a solution to be used for hydrothermal treatment, respectively, various dielectric substances can be formed.

Furthermore, an aqueous solution obtained by adding at least one selected from magnesium, calcium and strontium into a barium hydroxide aqueous solution may be used. A dielectric substance including barium titanate ($BaTiO_3$) constituting third dielectric layer 3c formed by adding at least one of magnesium, calcium and strontium into a barium hydroxide aqueous solution has a crystal structure in which part of barium is substituted by magnesium, calcium or strontium. With the above-mentioned addition, temperature dependency of the dielectric constant can be suppressed.

Furthermore, in this exemplary embodiment, as a solute of the aqueous solution to be used for hydrothermal treatment, barium hydroxide is used. However, the solute is not limited to this, and examples of the solute include barium acetate, barium chloride, barium hydrogen phosphate, barium fluoride, barium sulfate, barium nitrate, barium carbonate, barium bromide, barium iodide, barium perchlorate, barium oxalate, and the like. In this way, a solute capable of allowing a barium ion to be contained in an aqueous solution to be used for hydrothermal treatment, and then pH and the like of an electrolyte aqueous solution can be appropriately adjusted, third dielectric layer 3c the same as mentioned above can be formed.

(Step 5)

A polypyrrole film as solid electrolyte layer 4 is formed on anode body 2 that has been subjected to treatment of Step 4, and then cathode layer 6 or the like is formed as mentioned above, and thus a solid electrolytic capacitor is produced.

Figure 4:
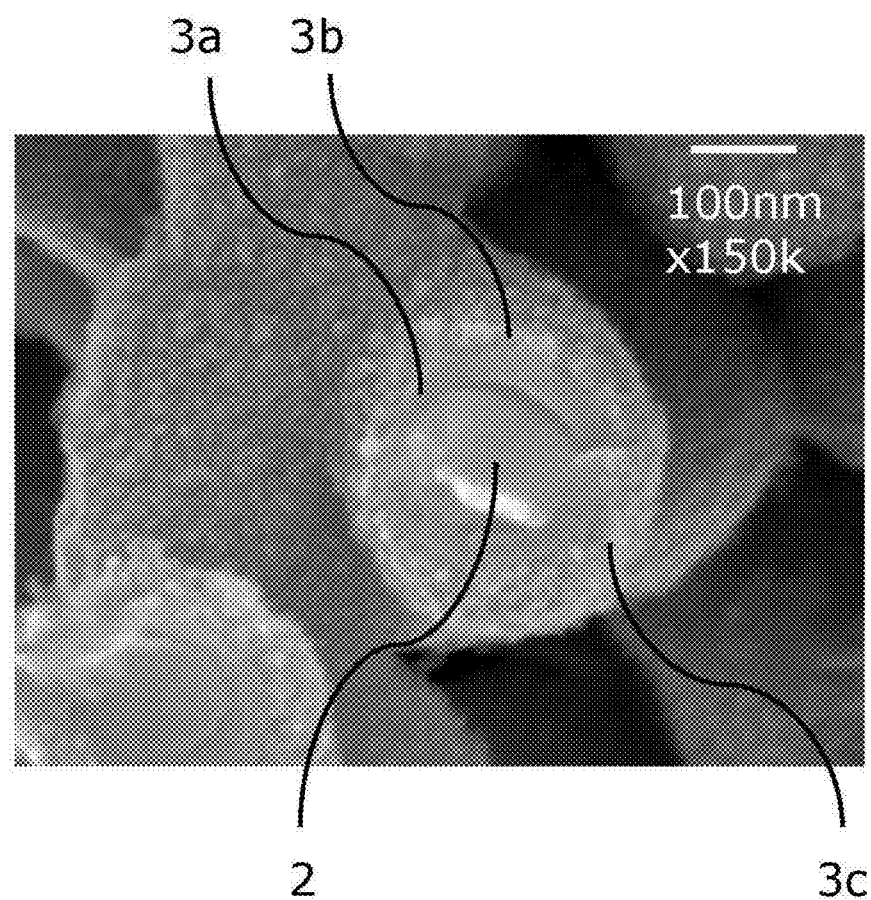
FIG. 4 is a scanning electron microscope photograph showing the anode body and each dielectric layer in accordance with one embodiment of the present invention.

FIG. 4 is a scanning electron microscope (SEM) photograph showing an anode body that has been subjected to treatment of Step 4.

As shown in FIG. 4, it is shown that first dielectric layer 3a, second dielectric layer 3b, and third dielectric layer 3c are formed on anode body 2. Furthermore, it is shown that third dielectric layer 3c include barium titanate particles.

Furthermore, since polyvinyl alcohol having high affinity to water penetrates into the inside of anode body 2 that is porous structure, and uniform polyvinyl alcohol cross-linked product is formed on the surface of porous structure by the subsequent heat treatment, titanium hydroxide can be precipitated to the inside of the porous structure. Thus, as shown in FIG. 4, uniform third dielectric layer 3c including barium titanate can be formed to the inside of the porous structure.

[Production of Sample]

As described below, samples of Example 1 and Comparative Examples 1 and 2 are produced, capacity in water and a leakage current are measured. The capacity in water is a value obtained by dividing values measured in 30 wt. % sulfuric acid aqueous solution at 120 Hz and 100 mV by an area of an anode. Furthermore, the leakage current is a value obtained 120 seconds after DC voltage of 10.5 V is applied in 0.98 wt. % phosphoric acid aqueous solution.

Example 1

Example 1 is described with reference to FIG. 3. As shown in FIG. 3(a), metal member 2a forming anode body 2 is prepared. Metal member 2a including tantalum sintered body is soaked in 0.05 wt. % polyvinyl alcohol (PVA) aqueous solution for 5 minutes, dried at 100° C. for 10 minutes. Thereafter, metal member 2a is soaked in 5.5 wt. % glutaraldehyde aqueous solution for 5 minutes, and reacted at 65° C. for 30 minutes and at 100° C. for 15 minutes, then washed with pure water for 15 minutes, and dried at 100° C. for 15 minutes. By repeating the above-mentioned operations again (twice in total), a polyvinyl cross-linked product as second dielectric layer 3b is formed on metal member 2a, as shown in FIG. 3(b).

Next, metal member 2a on which second dielectric layer 3b is formed is anodized at 15v in 1.5 wt. % titanium trichloride (TiCl₃) aqueous solution (electric current density: 1 mA/p, retention time: 3.5 hours, cathode: platinum). Thus, as shown in FIG. 3(c), first dielectric layer 3a including amorphous tantalum oxide is formed, and tetravalent titania sol 11a is precipitated. After the anodization is finished, metal member 2a is washed with pure water for 10 minutes, and dried at 65° C. for 15 minutes. Thereafter, heat treatment is carried out at 200° C. for three hours. Thus, as shown in FIG. 3(d), tetravalent titania sol 11a is formed into titanium oxide film 11b.

Next, metal member 2a on which titanium oxide film 11b is formed on the surface thereof by heat treatment after anodization in TiCl₃ is subjected to hydrothermal treatment at 80° C. in 8.6 wt. % barium hydroxide (Ba(OH)₂) aqueous solution for 72 hours. Thus, as shown in FIG. 3(e), titanium oxide film 11b is changed into barium titanate to form third dielectric layer 3c including barium titanate particles.

Comparative Example 1

Figure 5:
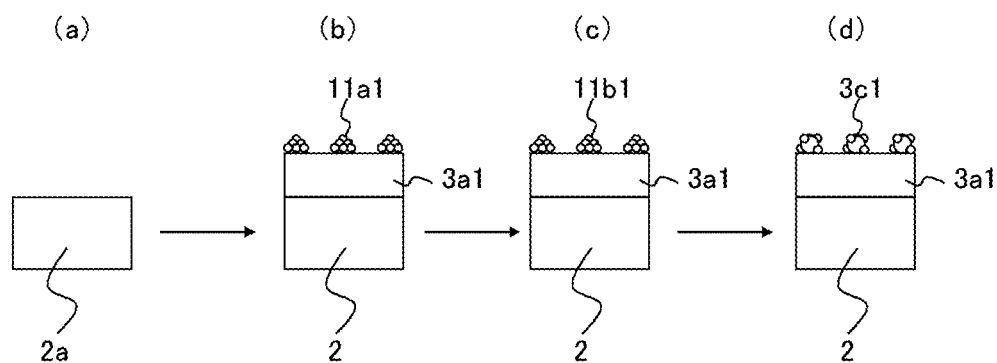
FIG. 5 is a schematic view showing manufacturing steps of Comparative Example 1.

Comparative Example 1 is described with reference to FIG. 5. As shown in FIG. 5(a), metal member 2a forming anode body 2 is prepared. Metal member 2a including a tantalum sintered body is anodized in 1.5 wt. % titanium trichloride (TiCl₃) aqueous solution at 15 v (electric current density: 1 mA/p, retention time: 3.5 hours, cathode: platinum). Thus, as shown in FIG. 5(b), dielectric layer 3a1 including amorphous tantalum oxide is formed, and tetravalent titania sol 11a1 is precipitated. After anodization is finished, metal member 2a is washed with pure water for 10 minutes and dried at 65° C. for 15 minutes. Thereafter, heat treatment is carried out at 200° C. for three hours. Thus, as shown in FIG. 5(c), tetravalent titania sol 11a1 is formed into titanium oxide film 11b1.

Next, metal member 2a on which titanium oxide film 11b1 is formed on the surface thereof by heat treatment after anodization in TiCl₃ is subjected to hydrothermal treatment at 80° C. in 8.6 wt. % barium hydroxide (Ba(OH)₂) aqueous solution for 72 hours. Thus, as shown in FIG. 5(d), titanium oxide film 11b1 is changed into barium titanate to form third dielectric layer 3c1 including barium titanate particles.

Comparative Example 2

Figure 6:
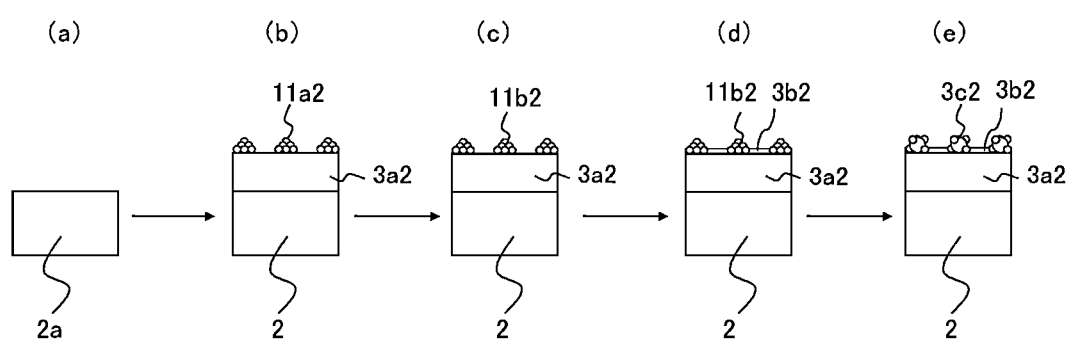
FIG. 6 is a schematic view showing manufacturing steps of Comparative Example 2.

Comparative Example 2 is described with reference to FIG. 6. As shown in FIG. 6(a), metal member 2a forming anode body 2 is prepared. Metal member 2a including a tantalum sintered body is anodized in 1.5 wt. % titanium trichloride (TiCl₃) aqueous solution at 15 v (electric current density: 1 mA/p, retention time: 3.5 hours, cathode: platinum). Thus, as shown in FIG. 6(b), dielectric layer 3a2 including amorphous tantalum oxide is formed, and tetravalent titania sol 11a2 is precipitated. After anodization is finished, anode body is washed with pure water for 10 minutes and dried at 65° C. for 15 minutes, and then heat-treated at 200° C. for three hours. Thus, as shown in FIG. 6(c), tetravalent titania sol 11a2 is formed into titanium oxide film 11b2.

Next, anode body 2 provided with titanium oxide film 11b2 is soaked in 0.05 wt. % polyvinyl alcohol (PVA) aqueous solution for 5 minutes, and then dried at 100° C. for 10 minutes. Thereafter, anode body 2 is soaked in 5.5 wt. % glutaraldehyde aqueous solution for 5 minutes at 65° C. for 30 minutes and reacted at 100° C. for 15 minutes, and then washed with pure water for 15 minutes at 100° C. for 15 minutes. By repeating the above-mentioned operations again (twice in total), as shown in FIG. 6(d), a polyvinyl cross-linked product as dielectric layer 3b2 is formed on dielectric layer 3a2.

Next, anode body 2 provided with dielectric layer 3b2 is subjected to hydrothermal treatment at 80° C. in 8.6 wt. % barium hydroxide (Ba(OH)₂) aqueous solution for 72 hours. Thus, as shown in FIG. 6(e), titanium oxide film 11b2 is changed into barium titanate to form dielectric layer 3c2 including barium titanate particles.

Measurement results are shown in Table 1. As is apparent from Table 1, the capacity in water is larger and the leakage current is smaller in Example 1 as compared with those in Comparative Examples 1 and 2. This is because dielectric layers 3c1 and 3c2 including barium titanate particles are formed only partially, and are not formed in a layer shape unlike third dielectric layer 3c of Example 1. Therefore, it is shown that a solid electrolytic capacitor and a manufacturing method in accordance with the invention of the present application are technically excellent.

TABLE 1

| | | Capacity in water ($\mu F/cm^2$) | Leakage current ($\mu A/cm^2$) |
|---|---|---|---|
| Example 1 | PVA coating $\Rightarrow$ anodization $\Rightarrow$ formation of barium titanate | 3.66 | 0.67 |
| Comparative Example 1 | anodization $\Rightarrow$ formation of barium titanate | 3.40 | 1.17 |
| Comparative Example 2 | anodization $\Rightarrow$ PVA coating $\Rightarrow$ formation of barium titanate | 3.18 | 1.06 |

The above-mentioned exemplary embodiment and Examples show examples in which a sintered body obtained by sintering particles of a valve metal or an alloy is used as an anode body, but the present invention is not necessarily limited to this, and as mentioned above, a solid electrolytic capacitor using a metal foil or an alloy foil of a valve metal may be used.

What is claimed is:

1. A solid electrolytic capacitor comprising:
an anode body;
a first dielectric layer formed on the anode body and including metal oxide;
a second dielectric layer formed on the first dielectric layer and including an insulating polymer;
a third dielectric layer formed on the second dielectric layer and including a dielectric substance having a higher dielectric constant than that of the metal oxide; and
a solid electrolyte layer formed on the third dielectric layer.

2. The solid electrolytic capacitor according to claim 1, wherein the insulating polymer includes at least one selected from the group consisting of a sulfonic acid group, a carboxylic acid group, a phosphoric acid group, a phosphonic acid group and a hydroxyl group, and is cross-linked.

3. The solid electrolytic capacitor according to claim 1, wherein the insulating polymer is cross-linked polyvinyl alcohol which is cross-linked by using a cross-linking agent including at least two of an aldehyde group, a hydroxyl group and a carboxyl group, or a derivative of the cross-linked polyvinyl alcohol.

4. The solid electrolytic capacitor according to claim 1, wherein the dielectric substance constituting the third dielectric layer is barium titanate particle.

5. A method for manufacturing a solid electrolytic capacitor comprising: an anode body; a first dielectric layer formed on the anode body and including metal oxide; a second dielectric layer formed on the first dielectric layer and including an insulating polymer; a third dielectric layer formed on the second dielectric layer and including a dielectric substance having a higher dielectric constant than that of the metal oxide; and a solid electrolyte layer formed on the third dielectric layer,
the method comprising the steps of:
forming the second dielectric layer on a metal member forming the anode body; and
soaking the metal member provided with the second dielectric layer in a solution including an ion of a first metal that is at least one of metal elements constituting the third dielectric layer, carrying out energization using the metal member as an anode for anodizing a portion of the metal member, which is brought into contact with the second dielectric layer, so as to form the first dielectric layer, and precipitating an oxide layer of an ion of the first metal on the second dielectric layer.

6. The method for manufacturing a solid electrolytic capacitor according to claim 5,
further comprising the steps of:
soaking the metal member on which the oxide layer is precipitated in a solution including an ion of the second metal other than the ion of the first metal among metal elements constituting the third dielectric layer when the third dielectric layer includes a plurality of metal elements, and then heating the metal member, for changing the oxide layer into a dielectric substance including the first metal and the second metal so as to form the third dielectric layer.

7. The method for manufacturing a solid electrolytic capacitor according to claim 6,
wherein the dielectric substance is barium titanate.

8. The method for manufacturing a solid electrolytic capacitor according to claim 7,
wherein the solution including an ion of the first metal is a solution including a trivalent titanium ion, and the solution including the ion of the second metal is a solution including a barium ion.

* * * * *